June 25, 1935.  C. R. WIGNESS  2,006,225
INTERNAL COMBUSTION ENGINE
Filed March 1, 1933   4 Sheets-Sheet 1

Inventor
C. R. Wigness
By Hiram A. Sturges
Attorney

June 25, 1935.  C. R. WIGNESS  2,006,225
INTERNAL COMBUSTION ENGINE
Filed March 1, 1933   4 Sheets-Sheet 2

Inventor
C. R. Wigness
By Hiram A. Sturges
Attorney

June 25, 1935.   C. R. WIGNESS   2,006,225
INTERNAL COMBUSTION ENGINE
Filed March 1, 1933   4 Sheets-Sheet 3
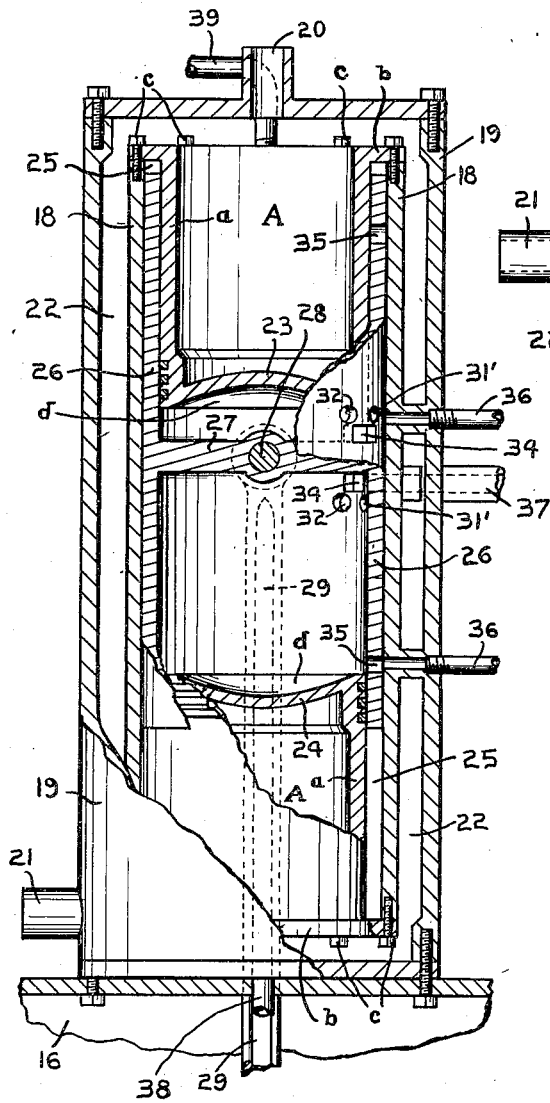
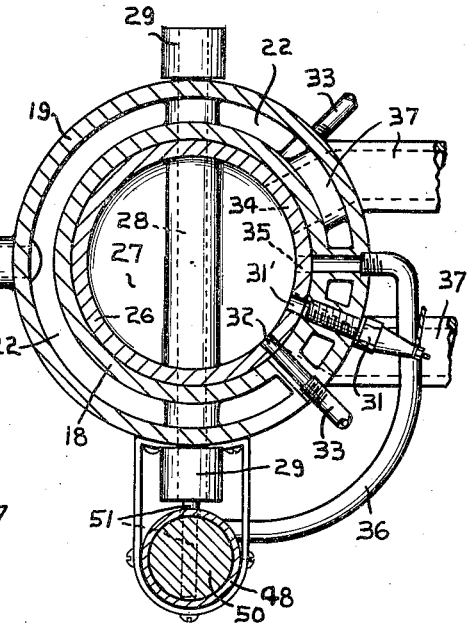
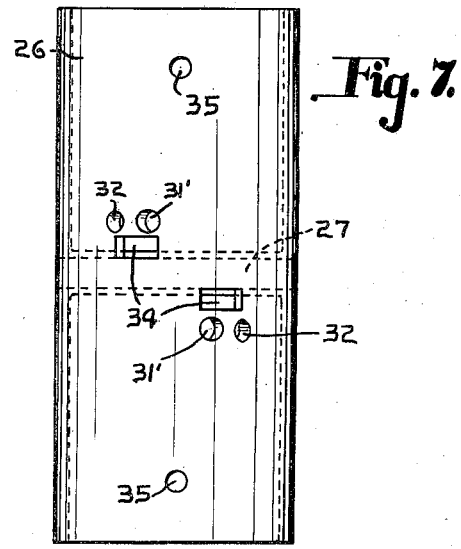
Inventor
C. R. Wigness
By Hiram A. Sturges
Attorney June 25, 1935.  C. R. WIGNESS  2,006,225
INTERNAL COMBUSTION ENGINE
Filed March 1, 1933  4 Sheets-Sheet 4
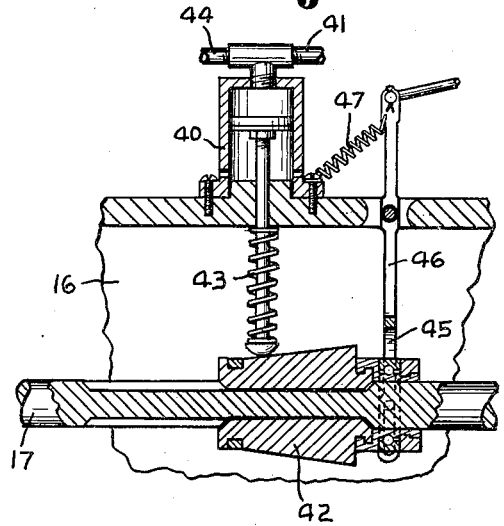
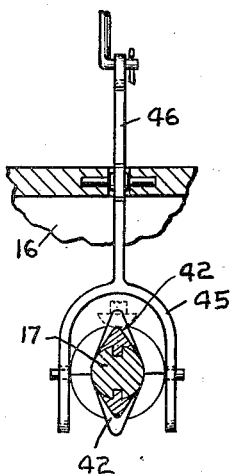
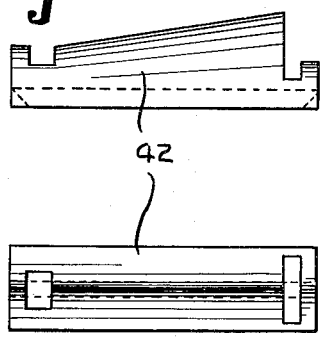
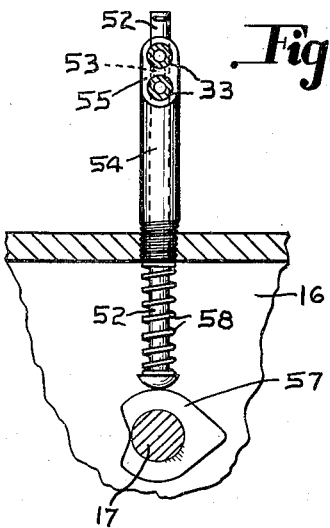
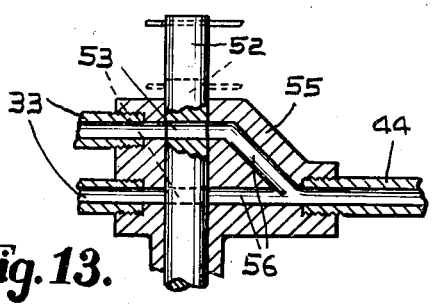
Inventor
C. R. Wigness
By Hiram A. Sturges, Attorney Patented June 25, 1935

2,006,225

UNITED STATES PATENT OFFICE 2,006,225

INTERNAL COMBUSTION ENGINE

Cornelius R. Wigness, Harlan, Iowa, assignor of one-fourth to William J. McDonald, Portsmouth, Iowa Application March 1, 1933, Serial No. 659,144

1 Claim. (Cl. 123—61)

This invention relates to an improvement in double-acting internal combustion engines, and has for its object, broadly, to provide a greater power for operation with a lesser number of parts, and requiring lesser relative space and weight than ordinary.

The invention includes a stationary cylinder provided inwardly of its ends with a pair of cylindrical core-blocks which completely close its ends and form a chamber centrally of the cylinder and also form a pair of concave recesses which open upon said chamber, the space between the cylinder and its core-blocks also forming a pair of annular recesses.

The invention also includes a piston formed as a sleeve with a partition or piston-head midway between its ends and disposed in the cylinder and arranged to be reciprocated therein, its cylindrical walls engaging in said annular recesses with its partition or piston-head disposed in the central chamber of the cylinder; a water jacket being provided for surrounding and supporting the cylinder. While only a single cylinder is shown and described for the engine, any suitable number may be used in connection with a single crank shaft.

On account of the peculiar construction of the cylinder, water jacket and piston, a fuel and air supply is pumped and introduced by action of the engine, which is considered to be an advantage.

With the foregoing objects in view and others to be mentioned, the invention presents a new and useful construction, combination and arrangement of parts, as described herein and claimed, and as illustrated in the drawings, it being understood that changes may be made in form, size, proportion of parts and minor details, said changes being within the scope of the invention as claimed.

In the drawings, Fig. 1 is a view in side elevation of an internal combustion engine embodying my invention, and Fig. 2 is a plan view of the same.

Fig. 5 is a side view partly in section and broken away, showing interior parts of the cylinder, the piston therein, the water jacket and part of a crank case.

Fig. 6 is a transverse section on line 6—6 of Fig. 4. Fig. 7 is a side view of the piston.

Figure 1:
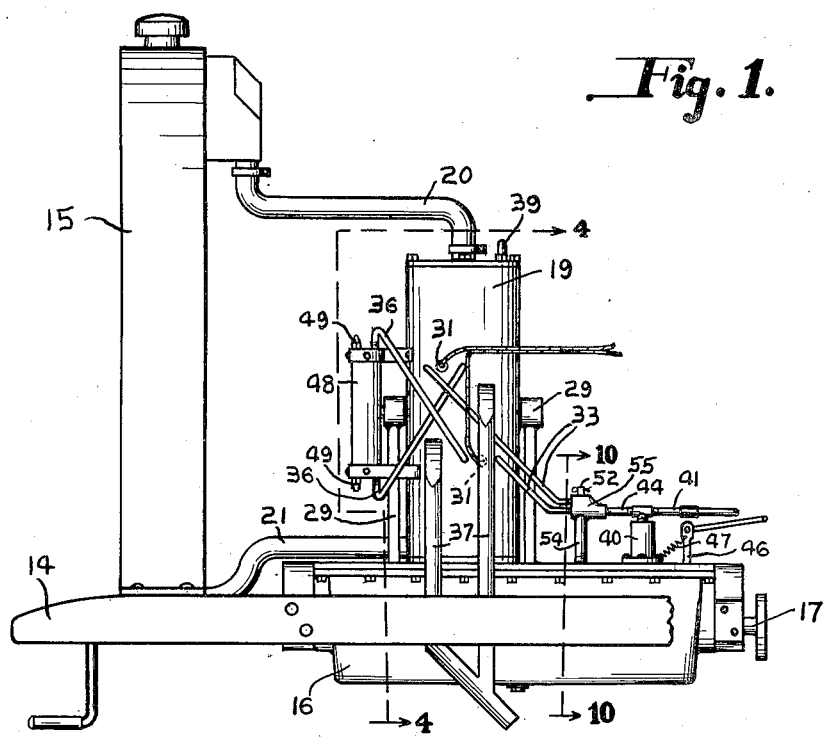
Figure 2:
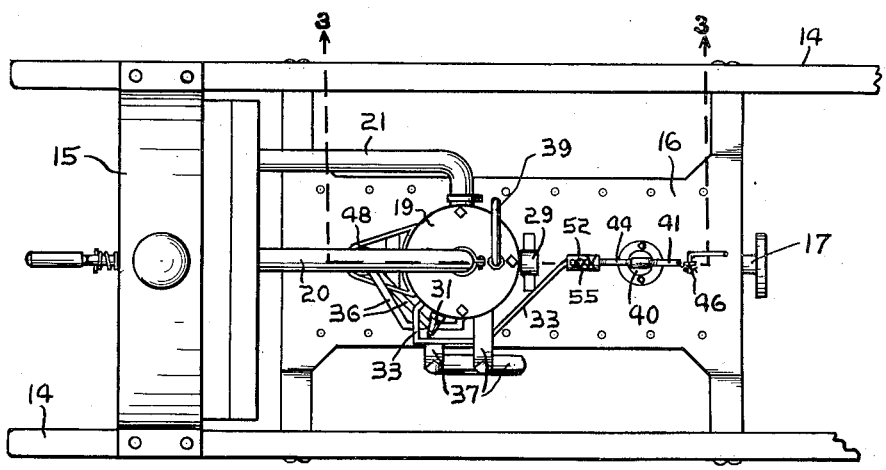
Figure 3:
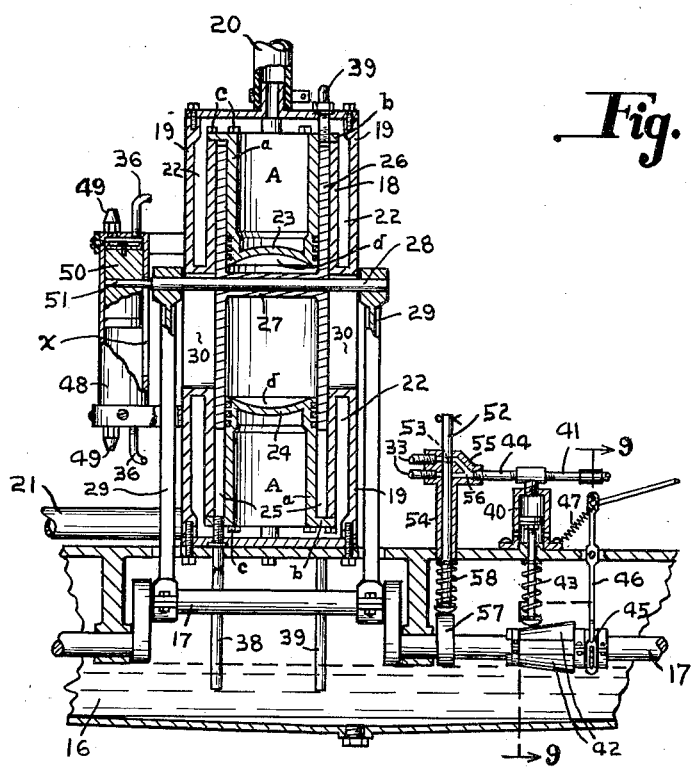
Fig. 3 is an enlarged detail, being a view in longitudinal section on line 3—3 of Fig. 2.

Figs. 8 to 10 inclusive illustrate details relating to Figs. 1, 2 and 3. Fig. 8 is a sectional view showing an adjustable pump for fuel. Fig. 9 is a section on line 9—9 of Fig. 3. Fig. 10 is a sectional view on line 10—10 of Fig. 1. Fig. 11 is a side view showing one half part of a bifurcated cam. Fig. 12 is a plan view of the part shown in Fig. 11. Fig. 13 is a sectional view, being a detail relating to Fig. 10.

Referring now to the drawings for a more particular description, the invention is shown and described in connection with the chassis 14 of a vehicle, the radiator 15, crank case 16 and crank shaft 17 of an internal combustion engine.

I provide a power cylinder 18 for the engine, said cylinder being provided with a water jacket 19 having pipes 20 and 21 communicating with the radiator to permit water to circulate in the annular chamber 22 as best shown in Fig. 5.

The engine cylinder 18 is provided inwardly of its ends with a pair of cylindrical core-blocks indicated at 23 and 24, each having a cylindrical wall or collar $a$ disposed in an end-portion of the cylinder and having a transversely disposed annular flange $b$ at its outer end which is secured by keepers $c$ to an end of the cylinder as clearly shown in Fig. 5, whereby water will be prevented from entering the annular recesses 25, and which permits a circulation of water inwardly of the ends of the cylinder in the pair of cylindrical recesses A which open on the ends of the cylinder 18.

Numeral 26 indicates a power piston having the form of a sleeve and provided with a partition 27 midway between its ends.

By referring to Fig. 5 it will be seen that the space in the cylinder 18 between the core-blocks 23 and 24 provides a compartment in which the partition 27 of the piston 26 may be reciprocated, the cylindrical extensions of the piston moving in the annular recesses 25 of the cylinder.

The partition 27 of the piston is provided with a coupling-pin 28, and at 29 are indicated a pair of connecting rods which are connected with the crank shaft, and are mounted at their upper ends on said pin, the ends of the coupling-pin moving in slots 30, said slots being formed in the opposed sides or walls of the cylinder 18 and jacket 19, and the walls of said cylinder and jacket being suitably connected adjacent to said slots so that no leakage will occur from the chamber 22 of the water jacket.

In operation, the crank shaft will have one-half of a rotatable movement for each longitudinal movement of the piston.

When the piston moves upwardly so that its partition 27 is disclosed closely adjacent to the core-block 23 the fuel will be compressed and exploded for moving the piston in a reverse direction with its partition 27 disposed closely adjacent to the core-block 24 at which time the fuel is compressed and exploded.

The recesses d formed at the concave sides of the core-blocks 23 and 24 may therefore be designated as mixing or explosion chambers. The spark plugs for these two explosion chambers d are indicated at 31, and the intake ports for receiving fuel for the piston are indicated at 32. Numerals 31' indicate ignition ports in the piston 26 to communicate with the spark plugs 31.

The tubes for conducting fuel to the explosion chambers are indicated at 33, as best shown in Fig. 1.

The exhaust ports in the piston at the opposed sides of the partition 27 are indicated at 34 best shown in Figs. 5 and 6.

On account of the construction of parts described and to be hereinafter described, the cost of fuel will be very limited. Oil may be used which is very lean in hydrocarbons and is broken up and forcibly conducted and discharged to the cylinder. Also compressed air is used as a part of the explosive mixture in the explosion chambers, the force for preparing said mixture being derived from the engine.

The intake ports in the piston, as best shown in Figs. 5 and 6, for compressed air are indicated at 35.

Numerals 36 indicate tubes for conducting compressed air to the intake ports 35 of the piston, and at 37 are indicated exhaust pipes which communicate with the exhaust ports 34 of the piston.

The piston is lubricated by means of a tube 38 leading from the crank case to the annular recess 25 at the lower end of the cylinder and a tube 39 leading from the crank case to the annular recess 25 at the top of the cylinder.

Any suitable means may be employed for compressing and conducting fuel to the explosion chambers d of the cylinder. This fuel may consist of any suitable material which, when broken up and mixed with air will produce a gas sufficiently rich in hydrocarbons to produce a required power when exploded.

Numeral 40 best shown in Figs. 8 and 9 indicates a pump for the fuel or hydrocarbon conducted thereto by a supply pipe 41, the stem of the piston of said pump engaging the periphery of a bifurcated cam 42 which is elliptical in cross-section, a spring 43 being used to cause a suitable engagement of the piston-stem with the cam which is splined on the crank shaft 17, and it will be understood that rotation of the crank shaft will cause operation of the pump 40, a check-valve (not shown) being used so that the fuel, by operation of the pump, will be forcibly moved to the pipe 44.

The cam 42 is of tapered form and may be adjusted on the crankshaft to control the length of the stroke of the piston, a yoke 45 being mounted on the end of the cam and having a rock-arm 46 pivotally mounted on the crank case 16 and controlled by a spring 47, and by adjusting the rock-arm 46 the quantity of fuel which is pumped and which enters the piston through the ports 32 thereof may be increased or decreased as may be required.

The pump used in compressing and moving air through the conducting-pipes 36 is indicated at 48. Numerals 49 indicate check-valves provided for the ends of the pump to permit intake of air to the pump and prevent exit of air to the atmosphere.

Numeral 50, shown in Fig. 3, indicates the piston for the pump 48 and it is reciprocated by the piston 26, a wrist-pin 51 being provided and engaging said piston, this wrist-pin being an extension or part of the coupling-pin 28, and during operation, when the piston 26 slides downwardly in the cylinder 18 the piston 51 will have a corresponding movement, the wrist-pin moving in the slot x which is formed in the casing of said pump.

It will be understood that the length of the slot x corresponds to the distance which the piston 26 moves in its stroke, and since the slot x has a lesser length than the casing of the pump the end-portions of said casing will operate to contain air to be moved into the air conducting-pipes 36, the volume of air moved by each stroke of the piston 51 being approximately equal to one-half of the volume of said piston 51; and this piston has an adequate length so that it will be practical in operation.

The parts are of such proportion that air will be subjected to a high degree of pressure and will enter the two explosion chambers d in alternation, and will move from the pump 48 through one of the pipes 36, and one of the intake ports 35 of the piston 26 at each stroke of the piston 51.

At each instant when the air is compressed in a chamber d the fuel will also be compressed therein, this fuel being hydrocarbon of any required quality or degree of richness to provide adequate power for operation.

Means are provided to cause the hydrocarbon to be delivered to the two explosion chambers d in alternation. As best shown in Figs. 10 and 13, a plunger-bar 52 is provided with a by-pass 53 and adapted to be reciprocated through a tubular standard 54 which is mounted on the crank case 16, said standard having a head-piece 55 provided with passageways 56 leading from the fuel supply-pipe 44 to the pipes 33.

The means for reciprocating the plunger-bar 53 is a cam 57 approximately of heart-shape, a spring 58 being used for maintaining the plunger in engagement with said cam. It is obvious that at each half rotation of the crank-shaft the apex of the cam 57 will move the plunger-bar 52 upwardly to permit the liquid fuel or hydrocarbon to move through the upper passageway 56 and by-pass 53, the lower passageway 56 being closed and at the next half-rotation of the crank-shaft the plunger-bar will engage the hollow part of said cam to dispose the by-pass 53 in register with the lower passageway 56 to permit a movement of the fuel or hydrocarbon from the pipe 44 to the lower conducting-pipe 33, and in operation the movements of hydrocarbon and air to the piston 26 will be simultaneous.

Any suitable arrangement for igniting the explosive mixtures in alternation, in the chambers d may be provided, these ignitions occurring at times when the piston 26 has completed its strokes.

The two exhaust ports 24 for the piston 26 are disposed closely adjacent to the opposed sides of the partition 27 as best shown in Figs. 5 and 7, and may be designated as the upper and lower ports.

Figure 4:
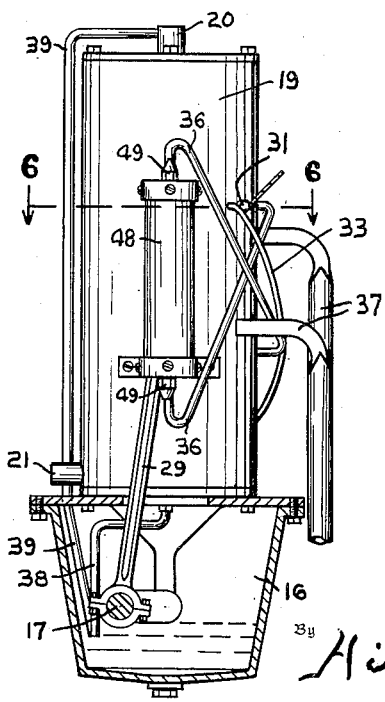
Fig. 4 shows parts of the engine, the crank case being in transverse section on line 4—4 of Fig. 1.

According to the arrangement of the pumps for air and hydrocarbon and conducting-pipes therefor as shown in Figs. 1 and 4, it will be understood that when the piston 26 slides upwardly and has completed its upward stroke as shown in Fig. 5, the air and hydrocarbon in the upper chamber $d$ will be compressed and exploded, neither one of the exhaust ports being in communication with the upper chamber $d$ at that time. Also it will be understood that while the piston 26 is in its uppermost position, the lower exhaust port of said piston will be disposed in register with an exhaust pipe 37, and at that time air and hydrocarbon will enter that part of the piston 26 below its partition 27.

When the piston slides downwardly to the lowermost position the upper exhaust port will be disposed in register with an exhaust pipe, and air and hydrocarbon will be compressed and exploded in the lower chamber $d$.

I claim as my invention,—

In a double acting internal combustion engine, a power cylinder closed at its ends and provided with a pair of inlet ports for compressed fuel, a pair of inlet ports for compressed air and a pair of exhaust outlet ports, a power piston working in and controlling the ports of the power cylinder and having cylindrical extensions open at their ends each provided with a single inlet port for compressed fuel, an inlet port for compressed air and an exhaust outlet port adapted, respectively, to register with a compressed fuel inlet port, a compressed air inlet port and an exhaust outlet port of said power cylinder and permitting formation of fuel mixtures in the cylindrical extensions of said power piston, a pair of conduits for delivering compressed fuel to the fuel inlet ports of the power cylinder, a pivot-pin carried by the power piston and having an extension, a crankshaft connected with and rotatable by actuation of the power piston, an air pump cylinder provided at its ends with check valves, air tubes leading from the air pump cylinder to the air inlet ports of the power cylinder, a piston in the air pump cylinder and mounted on the extension of said pivot-pin for compressing and delivering compressed air to said air tubes by actuation of said power piston, and electrical devices for igniting the fuel mixtures to cause actuation of the power piston.

CORNELIUS R. WIGNESS.